United States Patent
Pritchard

(10) Patent No.: US 10,449,864 B2
(45) Date of Patent: Oct. 22, 2019

(54) MOTOR/ENERGY GENERATOR AND ENERGY STORAGE DEVICE COMBINATION

(71) Applicant: BorgWarner Inc., Auburn Hills, MI (US)

(72) Inventor: Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/679,120

(22) Filed: Apr. 6, 2015

(65) Prior Publication Data

US 2015/0291037 A1 Oct. 15, 2015

Related U.S. Application Data

(60) Provisional application No. 61/979,813, filed on Apr. 15, 2014.

(51) Int. Cl.
| | |
|---|---|
| *B60L 11/00* | (2006.01) |
| *B60W 10/00* | (2006.01) |
| *B60L 50/40* | (2019.01) |
| *B60L 50/30* | (2019.01) |
| *B60L 58/20* | (2019.01) |

(52) U.S. Cl.
CPC ............ *B60L 11/005* (2013.01); *B60L 50/30* (2019.02); *B60L 50/40* (2019.02); *B60L 58/20* (2019.02); *B60W 10/00* (2013.01); *Y02T 10/7005* (2013.01); *Y02T 10/7022* (2013.01); *Y02T 10/7027* (2013.01); *Y02T 10/7033* (2013.01); *Y02T 10/7066* (2013.01)

(58) Field of Classification Search
CPC ........................................................ B60L 7/10
See application file for complete search history.

(56) References Cited

U.S. PATENT DOCUMENTS

| | | | |
|---|---|---|---|
| 5,568,023 A | 10/1996 | Grayer et al. | |
| 6,155,364 A | 12/2000 | Nagno et al. | |
| 7,552,787 B1 | 6/2009 | Williams | |
| 2005/0164827 A1* | 7/2005 | Beaty | B60K 1/02 477/3 |
| 2005/0209046 A1* | 9/2005 | Potter | F16H 61/0213 477/115 |
| 2006/0250902 A1* | 11/2006 | Bender | B60K 6/46 369/1 |
| 2008/0290842 A1* | 11/2008 | Davis | B60L 7/24 320/166 |
| 2010/0304920 A1* | 12/2010 | Simon | B60W 20/00 477/3 |
| 2011/0214528 A1 | 9/2011 | Foley et al. | |
| 2012/0031224 A1 | 2/2012 | Tarrant | |
| 2012/0078481 A1* | 3/2012 | Aldrich, III | B60L 7/10 701/70 |
| 2012/0143422 A1* | 6/2012 | Kitahata | F16H 57/0457 701/22 |
| 2012/0161497 A1 | 6/2012 | He et al. | |

(Continued)

FOREIGN PATENT DOCUMENTS

| | | |
|---|---|---|
| EP | 1279543 A2 | 1/2003 |
| EP | 1125780 B1 | 1/2007 |

*Primary Examiner* — Muhammad S Islam
(74) *Attorney, Agent, or Firm* — BrooksGroup

(57) ABSTRACT

A number of variations may include a motor/energy generator and energy storage device combination.

14 Claims, 4 Drawing Sheets

(56) References Cited

U.S. PATENT DOCUMENTS

| | | | |
|---|---|---|---|
| 2012/0240564 A1* | 9/2012 | Wesolowski | B60K 6/12 60/327 |
| 2013/0028740 A1* | 1/2013 | Koehnke | F03D 7/0224 416/147 |
| 2013/0096759 A1* | 4/2013 | Breton | B60W 20/10 701/22 |
| 2014/0171260 A1* | 6/2014 | Dalum | B60W 20/10 477/5 |

* cited by examiner

MOTOR/ENERGY GENERATOR AND ENERGY STORAGE DEVICE COMBINATION

CROSS-REFERENCE TO RELATED APPLICATIONS

This is application claims the benefit of U.S. Provisional Application Ser. No. 61/979,813 filed Apr. 15, 2014.

TECHNICAL FIELD

The field to which the disclosure generally relates to includes motor/energy generator and energy storage device combinations.

BACKGROUND

Vehicles operate in a manner which generates wasted energy.

SUMMARY OF ILLUSTRATIVE VARIATIONS

A number of variations may include a motor/energy generator and energy storage device combination, which may include a module which may include a housing having a first motor/energy generator device and an energy storage device therein.

In a number of variations the motor/energy generator and energy storage combination, which may be connected to a rear driveline of a vehicle.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
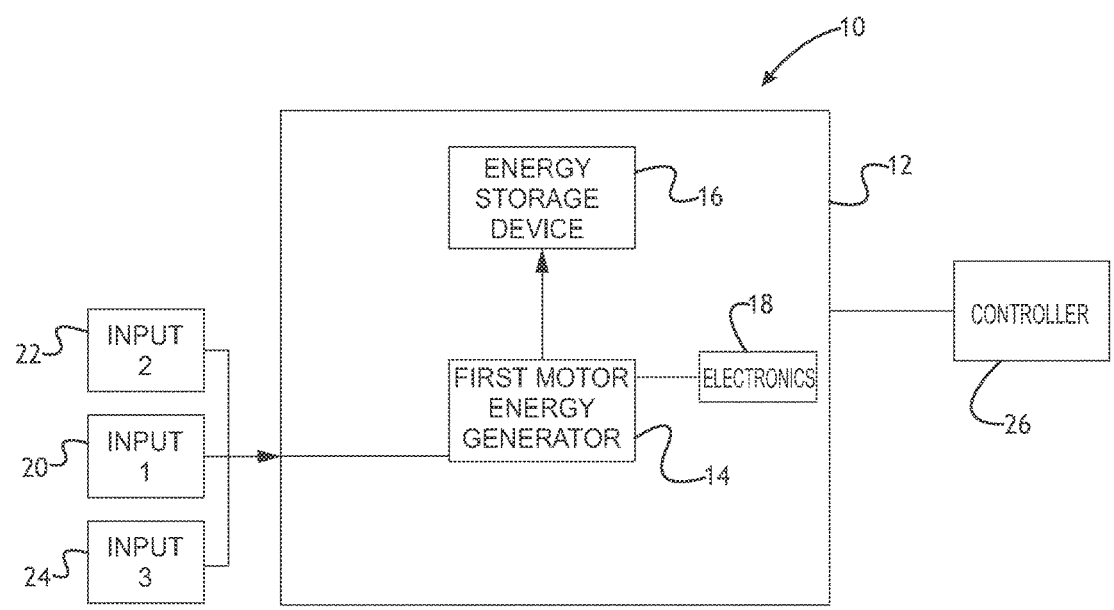
FIG. 1 is a schematic illustration including a motor/energy generator and energy storage device combination according to a number of variations.

A number of variations are illustrated in FIG. 1, which may include a product 10 including a motor/energy generator and energy storage device combination which may include a housing 12 which may include therein a first motor/energy generator 14 which may be operatively connected to an energy storage device 16 to store energy generated by the first motor/energy generator 14. Waste energy from a vehicle may be recovered and produced into a storable form of energy utilizing the first motor/energy generator 14. For example, waste energy from a first input 20 may be coupled to the first motor/energy generator 14. Optionally, a second waste energy input 22 and/or a third waste energy input 24 may be recovered and converted to a storable energy form using the first motor/energy generator 14. In a number of variations, the first motor/energy generator 14 may be operatively connected to a secondary drive axle, which in a number of variations may be a rear driveline of a vehicle to recover energy from the rotation of one or more components in the rear driveline, for example, when the vehicle is coasting or stopping. Optionally, as will be appreciated from FIG. 3, a second motor/energy generator 28 may be included in the housing 12. Electronic controls 18 such as power electronics and/or one or more controllers for the first motor/energy generator 14 and/or energy storage device 16 may also be included in the housing 12. The motor/energy generator and energy storage module 10 may be operatively connected to a vehicle controller 26 to operate various components within the housing 12 and/or within the vehicle as desired.

Figure 2:
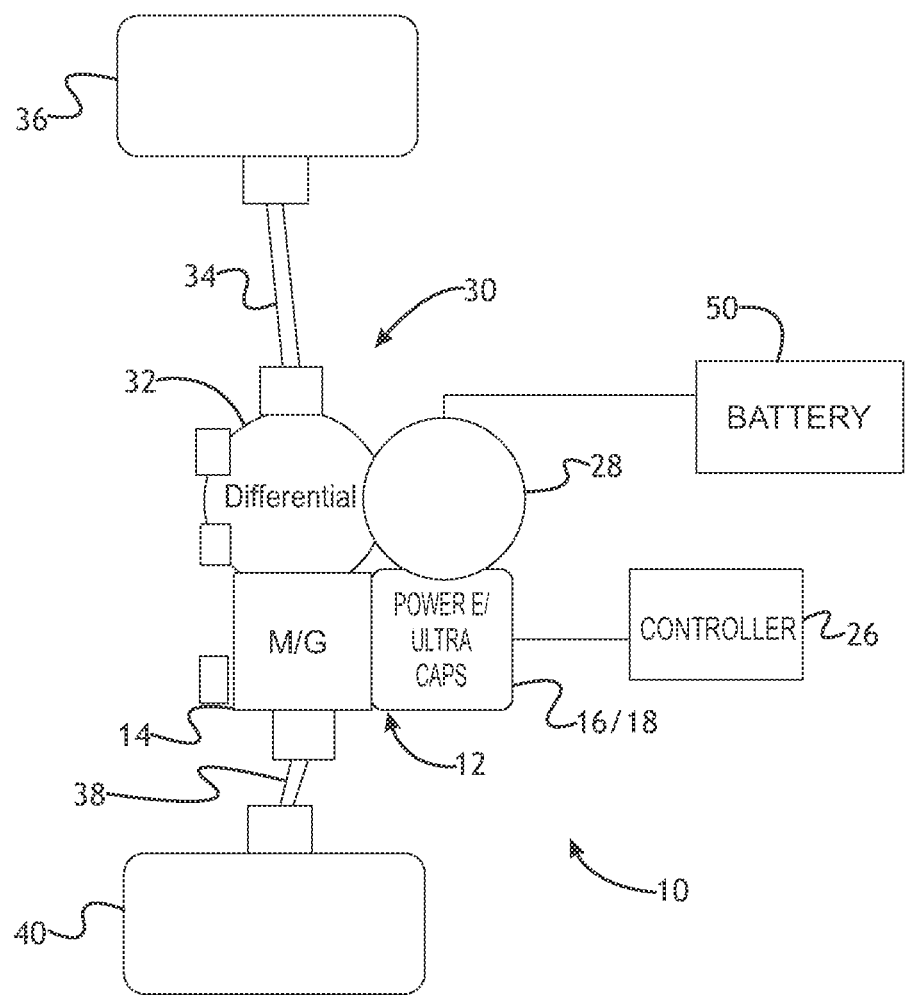
FIG. 2 is a schematic illustration of a motor/energy generator and energy storage device combination connected to a secondary drive axle of a vehicle according to a number of variations.

A number of variations are illustrated in FIG. 2 which may include a product combination 10 including a first motor/energy generator 14, power electronics and ultra-capacitor storage devices 16/18 and a second motor/energy generator 28. In a number of variations the first motor/energy generator 14, power electronics and ultra-capacitor storage devices 16/18 and a second motor/energy generator 28 may be include in a single housing 12 or may be a combination of components each having a separate housing of two or more components include in a common housing. The first motor/energy generator 14 may be operatively connected to a secondary drive axle 30, which in a number of variations may be a rear driveline of a vehicle. A secondary drive axle is an axle that is not directly connected to the prime mover (e.g., engine). In a front wheel drive vehicle the secondary drive axle is the rear driveline. The rear driveline 30 of the vehicle may include a differential 32, a left rear axle segment 34 operatively connected between the differential and a left wheel/tire 36. The rear driveline 30 may also include a right rear axle segment 38 operatively connected to a right rear wheel/tire 40 and the differential 32. The second motor/energy generator 28 may be connected to the flywheel of the vehicle. In a number of variations, one of the motor/energy generators 14, 28 may be installed on the flywheel axis and the other motor/energy generator installed on the vehicle drive axis. The motor/energy generators 14, 28 may be used in tandem with the drive axis unit acting as the generator when the braking creates an electrical power to accelerate the flywheel, resulting in energy storage. Likewise, upon redeployment the flywheel motor/generator 25 may be used as a generator supplying electrical power to the motor/energy generator on the drive axis, creating mode of force. The product 10 may be constructed and arranged in a number of variations to allow for the creation of hybrid vehicle architectures with minimal modifications to existing vehicle architectures by incorporating all of the components on secondary drive axle, such as but nit limited to a rear drive module and thereby minimizing required vehicle modifications.

Figure 3:
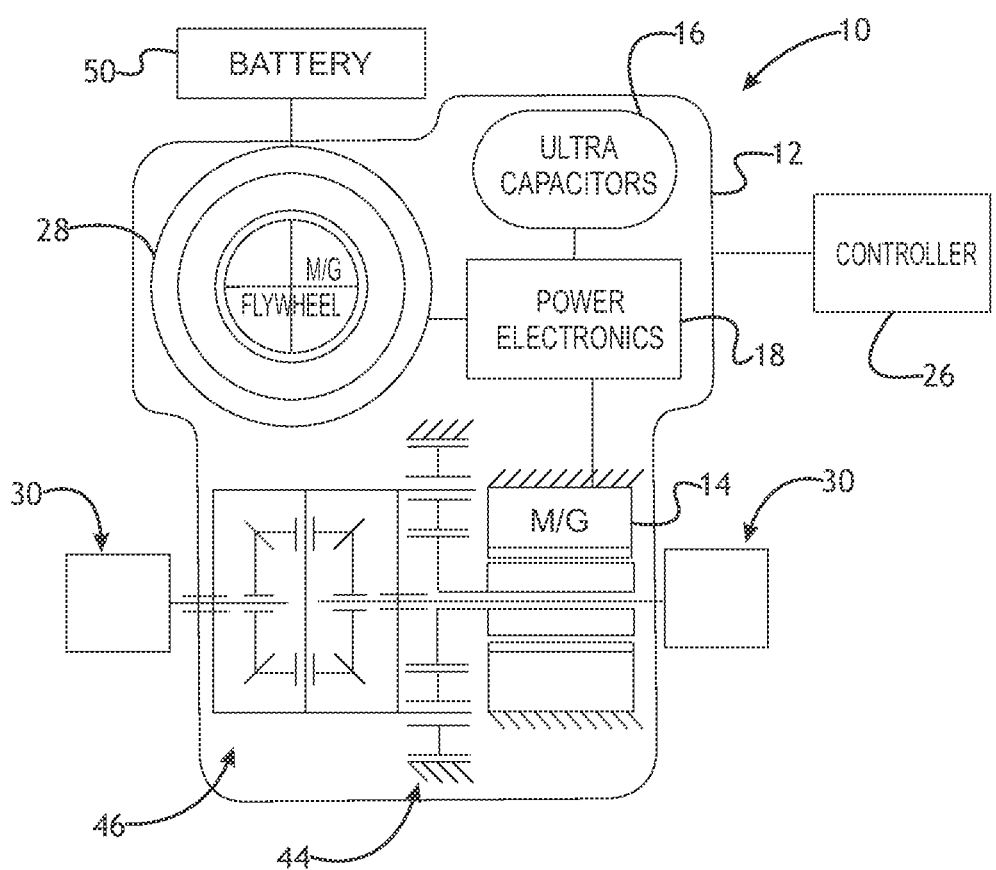
FIG. 3 is a schematic illustration of a product including a motor/energy generator and storage combination including a first motor/energy generator connected to the rear driveline of a vehicle and a second motor/energy generator connected to a vehicle flywheel according to a number of variations.

In a number of variations, for example as illustrated in FIGS. 2-3 the flywheel motor/generator 28 may be operatively connected to a vehicle battery so the energy generated by the flywheel motor/generator 28 may be used to recharge the battery, and energy from the battery 50 may be used to power the flywheel motor/generator 28.

FIG. 3 illustrates a number of variations wherein the first motor/energy generator 14 may be included in the housing 12 and is operatively connected to the driveline 30 of the vehicle. A second motor/energy generator 28 is also included in the housing 12 and may be operatively connected to the vehicle flywheel. One or more ultra-capacitors 16 may be included in the housing as well as power electronics 18. Again, a controller 26 may be operatively connected to the module 10.

Figure 4:
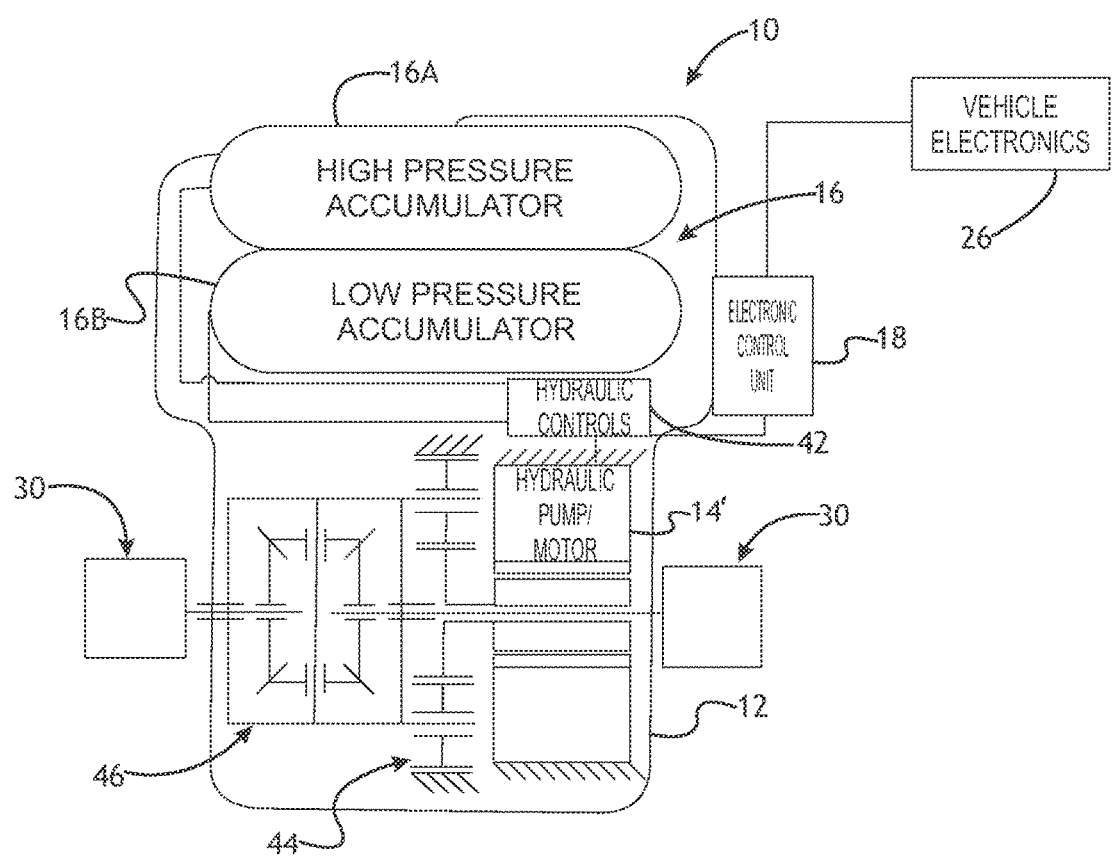
FIG. 4 is a schematic illustration of a product including a energy storage device combination including a first motor/hydraulic pump and at least a first hydraulic accumulator according to a number of variations.

A number of variations are illustrated in FIG. 4 wherein the housing 12, which may include therein a motor/hydraulic pump 14' which may be operatively connected to the driveline 30 of the vehicle. An energy storage device 16 may be included in the housing 12 and may include a first accumulator 16a and/or a second accumulator 16b. In a number of variations, a high pressure accumulator 16a may be provided along with a low pressure accumulator 16b. Hydraulic controls 42 may also be included in the housing 12 which may include electronics as well as control valves for controlling the flow of hydraulic fluid from the hydraulic pump into accumulator 16a/16b and also retaining the hydraulic fluid in the accumulators under pressure until it is desirable to release the hydraulic fluid from the accumulators for use elsewhere in the vehicle or to run the hydraulic pump in reverse to drive the motor/generator 14". The high pressure accumulator 16 and the low pressure accumulator 18 may be of any type of accumulator known to those skilled in the art. For example, the accumulator 16a, 16b may include a housing defining a variable volume chamber produced by the use of a spring having a biasing force less than the force of fluid pumped by the motor.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising a module including a housing, and a first motor/energy generator contained within the housing; an energy storage device contained within the housing, and wherein the energy storage device includes one or more ultra-capacitors or one or more hydraulic accumulators.

Variation 2 may include a product as set forth in Variation 1 wherein the energy storage device includes one or more hydraulic accumulators.

Variation 3 may include a product as set forth in any of Variations 1-2 and further comprising a vehicle driveline, and wherein the module is connected to the driveline so that the first motor/energy generator is turned by the driveline.

Variation 4 may include a product as set forth in any of Variations 1-3 wherein the module includes one or more ultra-capacitors contained within the housing, and further comprising a second motor/energy generator contained within the housing.

Variation 5 may include a product as set forth in Variation 4 wherein the first motor/energy generator is operatively connected to a rear driveline of a vehicle and wherein the second motor/energy generator is operatively connected to a flywheel of a vehicle.

Variation 6 may include a product comprising a combination comprising a first motor/energy generator and an energy storage device operative connected to the first motor/energy generator to store energy produced by the first motor/energy generator in the energy storage device, the combination being operatively connected to a vehicle driveline so that the motor/generator is turned by the driveline.

Variation 7 may include a product as set forth in Variation 6 wherein the first motor/energy generator and an energy storage device share a common housing.

Variation 8 may include a product as set forth in any of Variations 6-7 and further comprising a second motor/energy generator operative connected to a flywheel of the vehicle.

Variation 9 may include a product as set forth in Variation 8 wherein the first motor/energy generator, second motor/energy generator, and an energy storage device share a common housing.

Variation 10 may include a product as set forth in any of Variations 6-9 wherein the energy storage device includes one or more hydraulic accumulators.

Variation 11 may include a product as set forth in any of Variations 6-10 wherein the module includes one or more ultra-capacitors contained within the housing, and further comprising a second motor/energy generator contained within the housing.

The above description of select variations within the scope of the invention is merely illustrative in nature and, thus, variations or variants thereof are not to be regarded as a departure from the spirit and scope of the invention.

What is claimed is:

1. A product comprising:
   a first primary driveline comprising an engine;
   a second driveline comprising at least a differential, a first rear axle segment operatively connected to a first vehicle wheel, and a second rear axle segment operatively connected to a second vehicle wheel;
   a dedicated module comprising a single housing enclosing a motor/energy generator and energy storage device module comprising a first motor/energy generator, a second motor/energy generator, an energy storage device including at least one of one or more ultra-capacitors or one or more hydraulic accumulators, and a flywheel;
   wherein the first motor/energy generator is connected to the second driveline in line with the vehicle drive axis on at least one of the first rear axle segment or on the second rear axle segment and the energy storage device module is connected to the second driveline so that the first motor/energy generator is turned by the second driveline;
   wherein the second motor/energy generator is connected to the flywheel in line with the vehicle flywheel axis; and
   wherein the module is mechanically integrated directly into the second driveline.

2. A product as set forth in claim 1 wherein the second motor/generator is operatively connected to the vehicle battery so the energy generated by the second motor/generator is used to recharge the vehicle battery, and energy from the vehicle battery is used to power the second motor/generator.

3. A product as set forth in claim 1 further comprising a vehicle, and wherein the single housing is operatively connected to the vehicle.

4. A product as set forth in claim 1 wherein the first motor/energy generator is constructed and arranged to supply electrical power.

5. The product of claim 1, wherein the vehicle driveline is a secondary driveline.

6. A vehicle comprising:
- a combination module comprising a first-motor/energy generator, an energy storage device comprising at least one or more hydraulic accumulators operatively connected to the first motor/energy generator to store energy produced by the first motor/energy generator in the energy storage device, and a housing surrounding the first motor/energy generator and the energy storage device; and
- a vehicle driveline, the combination module being operatively connected to the vehicle driveline so that the first motor/energy generator is turned by the vehicle driveline;
- further comprising a second motor/energy generator operatively connected to a flywheel of the vehicle, the second motor/generator being connected to a vehicle battery to recharge the battery; and
- wherein the combination module is mechanically integrated directly into the vehicle driveline.

7. A vehicle as set forth in claim 6 wherein the second motor/energy generator is contained within the housing.

8. A vehicle as set forth in claim 6 further comprising a second motor/energy generator contained within the housing.

9. A vehicle as set forth in claim 6 wherein the first motor/energy generator is operatively connected to the energy storage device to store electrical energy generated by the first motor/energy generator.

10. A vehicle as set forth in claim 6 wherein the first motor/energy generator is constructed and arranged to supply electrical power.

11. A vehicle comprising:
- a combination module comprising a first motor/energy generator, a second motor/energy generator, and an energy storage device comprising at least one of one or more ultra-capacitors or one or more hydraulic accumulators operatively connected to the first motor/energy generator to store energy produced by the first motor/energy generator in the energy storage device, and a housing surrounding the first motor/energy generator and the energy storage device; and
- a vehicle driveline, the combination module being operatively connected to the vehicle driveline so that the first motor/energy generator is turned by the vehicle driveline;
- wherein the combination module is constructed and arranged to be integrated directly into the vehicle driveline.

12. A vehicle as set forth in claim 11 wherein the first motor/energy generator is operatively connected to the energy storage device to store electrical energy generated by the first motor/energy generator.

13. A vehicle as set forth in claim 11 wherein the first motor/energy generator is constructed and arranged to supply electrical power.

14. A product comprising:
- a motor/energy generator and energy storage device module comprising a first motor/energy generator, an energy storage device comprising at least one or more hydraulic accumulators, and a single housing, wherein the first motor/energy generator and the energy storage device are contained within the single housing;
- a vehicle driveline, wherein the first motor/energy generator is connected to the vehicle driveline so that the first motor/energy generator is turned by the vehicle driveline; and
- wherein the motor/energy generator and energy storage device module is integrated directly into the vehicle driveline.

* * * * *